United States Patent [19]

Goodwin et al.

[11] 4,227,673
[45] Oct. 14, 1980

[54] GASKET FOR CASTING LENSES

[75] Inventors: Bertram R. Goodwin, Feeding Hills; Bradford Canterbury, Sturbridge, both of Mass.

[73] Assignee: American Optical Corporation, Southbridge, Mass.

[21] Appl. No.: 65,661

[22] Filed: Aug. 10, 1979

[51] Int. Cl.² .................. B29C 1/00; B29D 11/00
[52] U.S. Cl. .................. 249/117; 249/160; 249/187 R; 425/DIG. 44; 425/DIG. 19; 425/808; 264/1
[58] Field of Search .............. 264/1; 249/117, 187 R, 249/160; 425/808, DIG. 44, DIG. 47

[56] References Cited
U.S. PATENT DOCUMENTS

| 2,542,386 | 2/1951 | Beattie | 425/808 |
| 2,593,456 | 4/1952 | James | 425/DIG. 44 |
| 3,056,166 | 10/1962 | Weinberg | 425/808 |
| 3,136,000 | 6/1964 | Slyk | 425/808 |
| 3,161,938 | 12/1964 | Graham | 425/DIG. 44 |
| 3,278,654 | 10/1966 | Grandperret | 425/808 |
| 3,480,251 | 11/1969 | Pietrzak | 425/DIG. 44 |
| 3,555,610 | 1/1971 | Reiterman | 425/808 |
| 3,672,807 | 6/1972 | Genz | 425/DIG. 47 |
| 3,761,208 | 9/1973 | Boudet et al. | 425/808 |
| 3,881,683 | 5/1975 | Whitney | 425/808 |

Primary Examiner—J. Howard Flint, Jr.
Attorney, Agent, or Firm—Jeremiah J. Duggan; Alan H. Spencer

[57] ABSTRACT

A gasket for a lens casting cell designed to accommodate for casting material shrinkage during curing in the cell.

7 Claims, 6 Drawing Figures

GASKET FOR CASTING LENSES

BACKGROUND OF THE INVENTION

1. Field of the Invention

Lens casting apparatus with particular reference to improvements in gaskets for lens casting cells.

2. Discussion of the Prior Art

Various synthetic resins have been used to make spectacles and instrument lenses, optical filters and the like. Lenses are traditionally cast between glass mold halves spaced apart by a T-shaped gasket and held with a spring clip as illustrated in U.S. Pat. No. 3,136,000, for example.

A casting precursor injected into the space between the mold halves is cured to a hardened state by exposing the filled cell to an elevated temperature for a proper period of time whereafter the lens is released from the cell. One effective lens is formed of a polymer produced from allyl diglycol carbonate, sold under the trademark CR39.

In view of the high shrinkage of optical casting resins during curing (approximately 13% for CR39), the casting cell gasket must be of sufficient resiliency to permit movement of the mold halves toward one another in the direction of lens thickness as resin shrinkage takes place. Shrinkage in directions normal to the direction of lens thickness, however, has heretofore presented the particular problem of premature release of lens material from the gasket walls which can cause distortion, cracking and other lens damage. This lack of proper adhesion of casting material to the gasket walls has seriously adversely affected acceptable product yield.

In light of the foregoing, it is an object of this invention to provide novel casting gasket geometry which will improve cast plastic lens yield and quality.

Another object is to provide a casting gasket geometry which, without appreciable added cost or complication of manufacture, offers unusual improvment in product yield and quality and greater than heretofore choice of gasket materials.

Still another object is to provide a casting gasket geometry which is readily adaptable to the casting of a wide variety of plastic compositions.

Other objects and advantages of the invention will become apparent from the following description.

SUMMARY OF THE INVENTION

The foregoing and corollary objects of the invention are accomplished with unique casting gasket geometry. Circumferential, or partial circumferential, slotting of a T-gasket structure reduces the usual gasket mass in this functional area so that internal stress in the gasket is reduced and greater response to lens curing shrinkage is permitted.

By so allowing the gasket to adjust according to lens material shrinkage, internal stress within the lens is minimized and cracking or other damage due to premature release from the gasket is avoided.

Details of the invention will become more readily apparent from the following description when taken in conjunction with the accompanying drawings.

IN THE DRAWINGS

DESCRIPTION OF THE PREFERRED EMBODIMENTS

Figure 1:
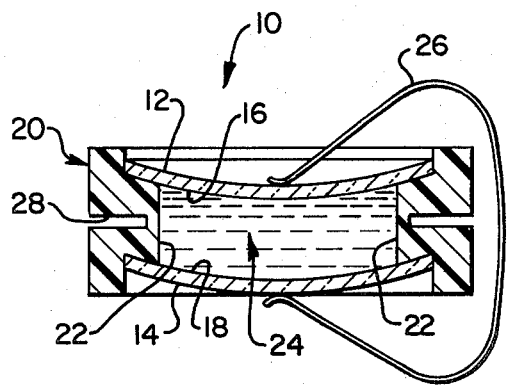
FIG. 1 is a vertical cross-sectional view of a lens casting cell embodying one form of the invention.
Figure 2:
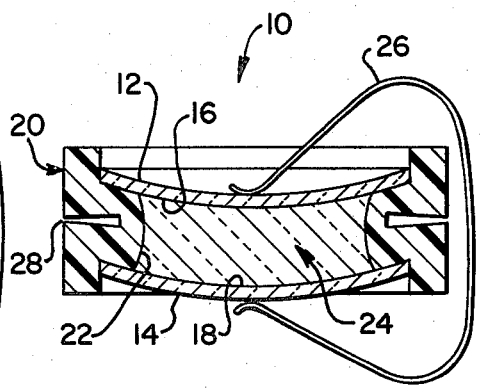
FIG. 2 is a similar vertical cross-sectional view of the casting cell of FIG. 1 illustrating a principal feature of the invention.

Referring to the drawings, FIGS. 1 and 2 illustrate a lens casting cell 10 comprised of a pair of mold halves 12 and 14 preferably formed of glass and optically finished on respective surfaces 16 and 18. Mold halves 12 and 14 are supported in the illustrated spaced relationship by an annular gasket 20 having a radially inwardly directed T-shaped cross-section and inner wall 22 which completes the casting cavity 24. Spring clamp 26 holds the mold halves 12 and 14 in place.

With injection of a liquid casting medium (e.g. monomeric allyl diglycol carbonate) into the closed cavity 24 and proper curing of the casting medium to a polymeric stage, lens L (FIG. 2) may be formed.

Details of useful casting compositions and curing procedures may be had by reference to U.S. Pat. Nos. 2,542,386; 3,056,166; 3,136,000; 3,881,683.

The present gasket 20 may be formed of any suitable resilient material such as a plasticized polyvinyl chloride composition or blends of various polymers. A composition known to the trade as Geon Plastic 8847 manufactured and sold by Goodrich Chemical Company of Ohio, U.S.A. is exemplary. The gasket may be molded to the shape desired using a mixture of virgin material alone or combined with a regrind of previously cast material.

A suitable glass for use in making mold halves 12 and 14 is optical crown.

Figure 6:
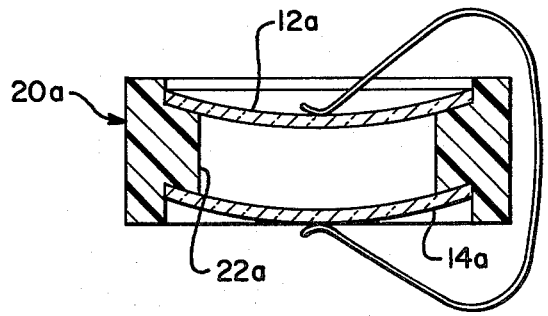
FIG. 6 is a vertical cross-sectional view of a prior art lens casting cell wherewith the improvement of the invention can be more easily understood.

Heretofore, lens casting gaskets were generally of the solid cross-sectional configuration 20a (FIG. 6) which, when softened under heat present in a lens curing cycle, allowed some degree of movement of mold halves 12a and 14a toward each other in response to shrinkage of a casting medium. While this can accommodate for at least some shrinkage more particularly in the direction of lens thickness, there has been the problem of lens material separation (premature release) from the gasket wall 22a, i.e. failure of the gasket wall to follow inward retraction of the cast lens edge. This gasket wall separation and/or separation from one or both mold halves 12a and 14a promotes lens cracking and distortion which, in turn, seriously affects product yield and quality.

Figure 3:
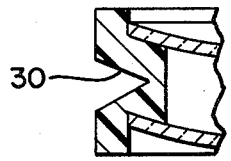
FIGS. 3, 4 and 5 are fragmentary cross-sectional illustrations of modifications of the invention.
Figure 4:
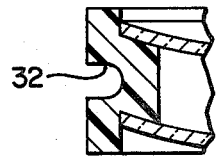
Figure 5:
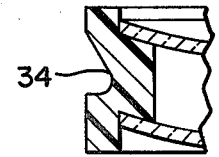

According to the present invention, gasket 20 is circumferentially (or partially circumferentially) radially inwardly slotted in a manner employing one or variations of the configurations of slots 28 (FIGS. 1 and 2), 30 (FIG. 3), 32 (FIG. 4), and 34 (FIG. 5). With such means, the gasket mass in the functional area of slotting is reduced so that the gasket is provided a sufficient degree of flexibility, particularly when heated to permit opposite sides of the gasket wall 22 and molds 12 and 14 to respectively draw toward each other as casting material shrinkage takes place. As the gasket material softens due to heat present in a lens curing cycle, pressure from clamp 26 causes the slotted gasket to collapse inwardly, conforming with the shrinking edge of the curing lens (FIG. 2). By so allowing the gasket wall 22 and mold halves to move with the shrinking lens, internal stresses are minimized within the lens and premature gasket wall release is avoided.

The present gasket design further permits the use of gasket materials not heretofore considered appropriate because of stiffness or lack of adhesion to the lens.

From the foregoing it can be seen that the geometrical configuration of gaskets used to cast plastic lenses is altered in such a manner as to provide a function of reduced stress within the gasket wall which accommodates inherent shrinkage of a lens during its curing cycle.

The term "lens" as used herein is intended to include all forms of such articles whether designed for ophthalmic or other uses. More particularly, the term is intended to include semi-finished lenses commonly referred to in the trade as "lens blanks".

It is also intended that the foregoing disclosure and accompanying illustrations be exemplary of the invention and not delimiting of its scope. All modifications and changes apparent to those skilled in the art are considered to be within the scope of this invention.

We claim:

1. A lense casting cell comprising the combination of:
    an annular resilient gasket having a radially inwardly directed generally T-shaped cross-sectional configuration, the inner most side of which provides a wall of a casting cavity within said cell;
    a pair of mold halves, one positioned against each of opposite sides of said gasket in adjoining relationship with said wall of said cavity, and
    said gasket having an approximately intermediately disposed external slot extending about a major position of the circumference of said gasket and extending radially inwardly toward said wall of said casting cavity for enhancing the flexibility of said gasket in the functional area thereof adjacent to said wall.

2. A gasket according to claim 1 wherein said slot extends about the complete circumference of said gasket.

3. A gasket according to claim 1 wherein said slot extends about a portion of said circumference of said gasket.

4. A gasket according to claim 1 wherein the extension of said slot into said gasket is of an approximate rectangular shape.

5. A gasket according to claim 1 wherein said extension of said slot into said gasket is of an approximate V-shape.

6. A gasket according to claim 1 wherein the extension of said slot into said gasket terminates with an arcuate configuration.

7. A gasket according to claim 6 wherein said termination of said slot is semi-circular.

* * * * *